(12) United States Patent
Yoshida et al.

(10) Patent No.: US 9,270,094 B2
(45) Date of Patent: Feb. 23, 2016

(54) GAS INSULATED SWITCHGEAR

(75) Inventors: Tadahiro Yoshida, Chiyoda-ku (JP);
Masahiro Arioka, Chiyoda-ku (JP);
Toru Nakanishi, Chiyoda-ku (JP);
Tetsuya Sato, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/359,935

(22) PCT Filed: Aug. 2, 2012

(86) PCT No.: PCT/JP2012/069648
§ 371 (c)(1),
(2), (4) Date: May 22, 2014

(87) PCT Pub. No.: WO2013/145358
PCT Pub. Date: Oct. 3, 2013

(65) Prior Publication Data
US 2014/0307366 A1 Oct. 16, 2014

(30) Foreign Application Priority Data
Mar. 27, 2012 (JP) ................................ 2012-071802

(51) Int. Cl.
*H02B 13/035* (2006.01)

(52) U.S. Cl.
CPC ........ *H02B 13/0358* (2013.01); *H02B 13/0354* (2013.01)

(58) Field of Classification Search
CPC ............ H05K 5/00; H02B 1/20; H02B 13/02; H02B 13/035; H02B 13/0354; H02B 13/0358; H01H 9/90; H01H 3/60; H01H 33/666; H01H 33/66207

USPC ......... 361/601, 604, 605, 612, 616, 618, 619, 361/621; 218/7, 10–14, 43, 45, 69, 73, 75, 218/80, 84, 118, 134, 139; 200/19.1, 48 A, 200/48 B, 540; 312/223.1, 223.2, 223.3
See application file for complete search history.

(56) References Cited

U.S. PATENT DOCUMENTS 6,510,046 B2 * 1/2003 Arioka et al. ................. 361/612
7,417,846 B2 * 8/2008 Arioka .......................... 361/612
(Continued)

FOREIGN PATENT DOCUMENTS

| CN | 101741029 A | 6/2010 | |
|---|---|---|---|
| DE | 41 03 101 A1 * | 9/1999 | ............. H01H 31/28 |

(Continued)

OTHER PUBLICATIONS

International Search Report (PCT/ISA/210) mailed on Aug. 28, 2012, by the Japanese Patent Office as the International Searching Authority for International Application No. PCT/JP2012/069648.
(Continued)

*Primary Examiner* — Michail V Datskovskiy
(74) *Attorney, Agent, or Firm* — Buchanan Ingersoll & Rooney PC (57) ABSTRACT

In a switchgear in which cables are used on both of the input side and the output side for connection between a main circuit and an external main circuit, a circuit breaker and connection conductors of the switchgear are stored in a box-shaped pressure tank together with insulating gas; an operating mechanism that performs opening and closing operation of the circuit breaker and a first cable connection portion that is connected to the connection conductors are attached to one face of the pressure tank; and a second cable connection portion that is connected to the connection conductors is attached to the other face of the pressure tank, the other face being parallel with respect to a direction connecting the operating mechanism and the circuit breaker.

14 Claims, 13 Drawing Sheets

(56) References Cited

U.S. PATENT DOCUMENTS

| | | | |
|---|---|---|---|
| 2002/0012226 A1* | 1/2002 | Arioka et al. | ................. 361/618 |
| 2005/0219804 A1* | 10/2005 | Arioka | .......................... 361/612 |
| 2012/0312667 A1* | 12/2012 | Hasegawa et al. | ............ 200/288 |

FOREIGN PATENT DOCUMENTS

| | | | | |
|---|---|---|---|---|
| EP | 1 107 408 A1 * | 6/2001 | ........... | H02B 13/035 |
| JP | 2-37506 U | 3/1990 | | |
| JP | 3-82309 A | 4/1991 | | |
| JP | 9-121411 A | 5/1997 | | |
| JP | 10-257658 A | 9/1998 | | |
| JP | 11-252720 A | 9/1999 | | |
| JP | 2000-270429 A | 9/2000 | | |
| JP | 2007-236036 A | 9/2007 | | |
| JP | 004693193 B1 * | 6/2011 | ........... | H01H 33/662 |

OTHER PUBLICATIONS

Communication and Supplementary Search Report dated Nov. 11, 2015 issued by the European Patent Office in corresponding European Patent Application No. 12873217.9 (9 pages).

* cited by examiner

GAS INSULATED SWITCHGEAR

TECHNICAL FIELD

The present invention relates to the configuration of a gas insulated switchgear.

BACKGROUND ART

In a gas insulated switchgear for use in power facilities of equal to or higher than 10 kV class, conventionally, when main circuit connection to external equipment such as a transformer is made by cables, a configuration is made such that a cable connection place for leading in or leading out a main circuit to the switchgear is provided to perform at only the front side or the back side of the switchgear from a standpoint of a balance between securement of insulation distance necessary for corresponding to withstand voltage performance and avoidance of an increase in size of a system. Accordingly, when both of the lead-in and the lead-out of the main circuit need to be performed by cables in one switchgear, connection portions of a plurality of cables need to be arranged in a state to be stacked in stages in the height direction of the switchgear and thus correspondence is made by increasing the height of the switchgear (for example, see Patent Document 1).

Furthermore, there also exists one in which a cable connection place for leading in or leading out a main circuit is provided to perform at both of the front side and the back side of a switchgear. However, a space for connecting cables is secured at both of the front side and the rear side of the switchgear; and accordingly, the size in the depth direction of the switchgear is increased (for example, see Patent Document 2).

PRIOR ART DOCUMENT

Patent Document

Patent Document 1: Japanese Unexamined Patent Publication No. 2007-236036 (Pages 4 to 5, Pages 7 to 8, FIG. 1, FIG. 2)

Patent Document 2: Japanese Unexamined Utility Model Publication No. H2-037506 (FIG. 1, FIG. 2)

SUMMARY OF THE INVENTION

Problems to be Solved by the Invention

The conventional gas insulated switchgear is the foregoing configuration. Accordingly, when power facilities of equal to or higher than 10 kV is installed in facilities such as a small tunnel, such a configuration cannot follow a reduction in size of the facilities; and thus, correspondence is made by a large electrical compartment disproportionate to small facilities. However, this lead to an increase in construction costs; and accordingly, a problem is to achieve a reduction in size of the gas insulated switchgear so as to be capable of corresponding to the small facilities.

The present invention has been made to solve the above described problem, and an object of the present invention is to obtain a gas insulated switchgear capable of reducing installation area and installation height.

Means for Solving the Problems

According to the present invention, there is provided a gas insulated switchgear including: a pressure tank in which a circuit breaker and connection conductors of the switchgear are stored inside together with insulating gas; an operating mechanism that is attached to one face of the pressure tank, and performs opening and closing operation of the circuit breaker; a first cable connection portion that is attached to one face of the pressure tank, and is connected to the connection conductors, the first cable connection portion being connected to the lead-in side or the lead-out side; and a second cable connection portion that is attached to the other face of the pressure tank parallel with respect to a direction connecting the operating mechanism and the circuit breaker, and is connected to the connection conductors, the second cable connection portion being connected to the side different from the first cable connection portion of the lead-in side or the lead-out side.

Furthermore, according to the present invention, there is provided a gas insulated switchgear in which a first cable connection compartment is arranged on the first side; a second cable connection compartment is arranged on the second side; and a control compartment is arranged between one lateral of the first cable connection compartment and one lateral of the second cable connection compartment.

Advantageous Effect of the Invention

According to the present invention, depth and width dimensions of the gas insulated switchgear can be reduced, whereby installation can be made even in a place where the depth and width dimensions are limited.

MODE FOR CARRYING OUT THE INVENTION

Embodiment 1

Figure 1:
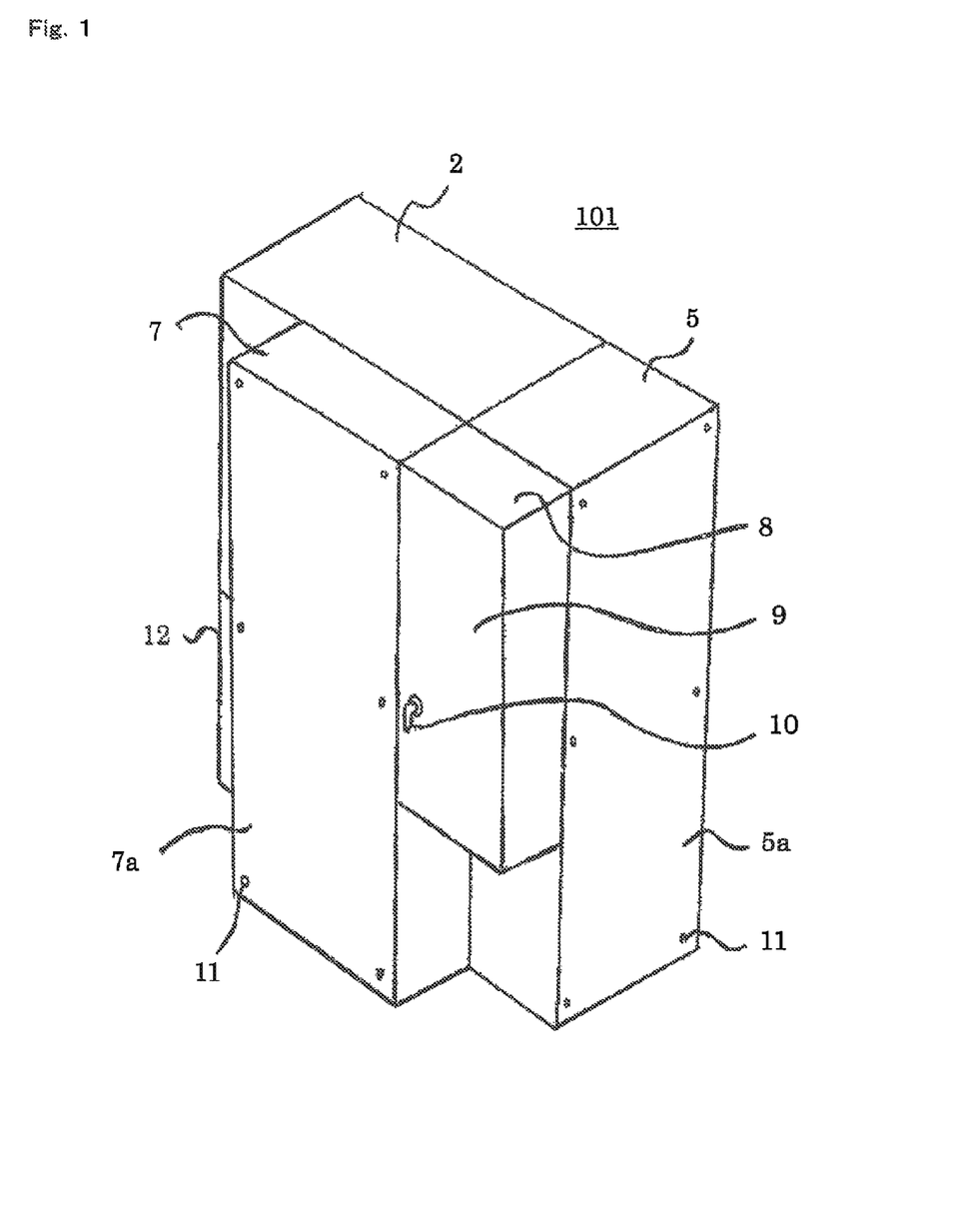
FIG. 1 is a perspective view showing a gas insulated switchgear of Embodiment 1 of the present invention.
Figure 2:
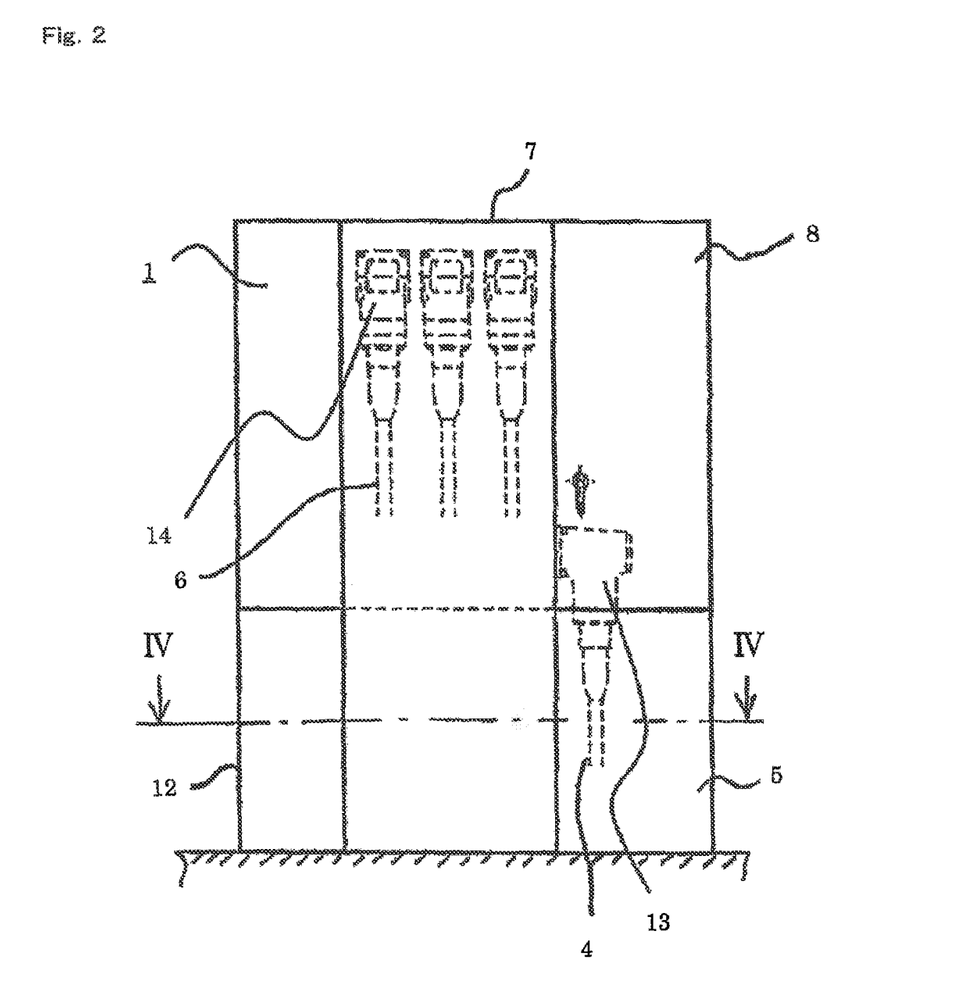
FIG. 2 is a front view showing the gas insulated switchgear of Embodiment 1 of the present invention.
Figure 3:
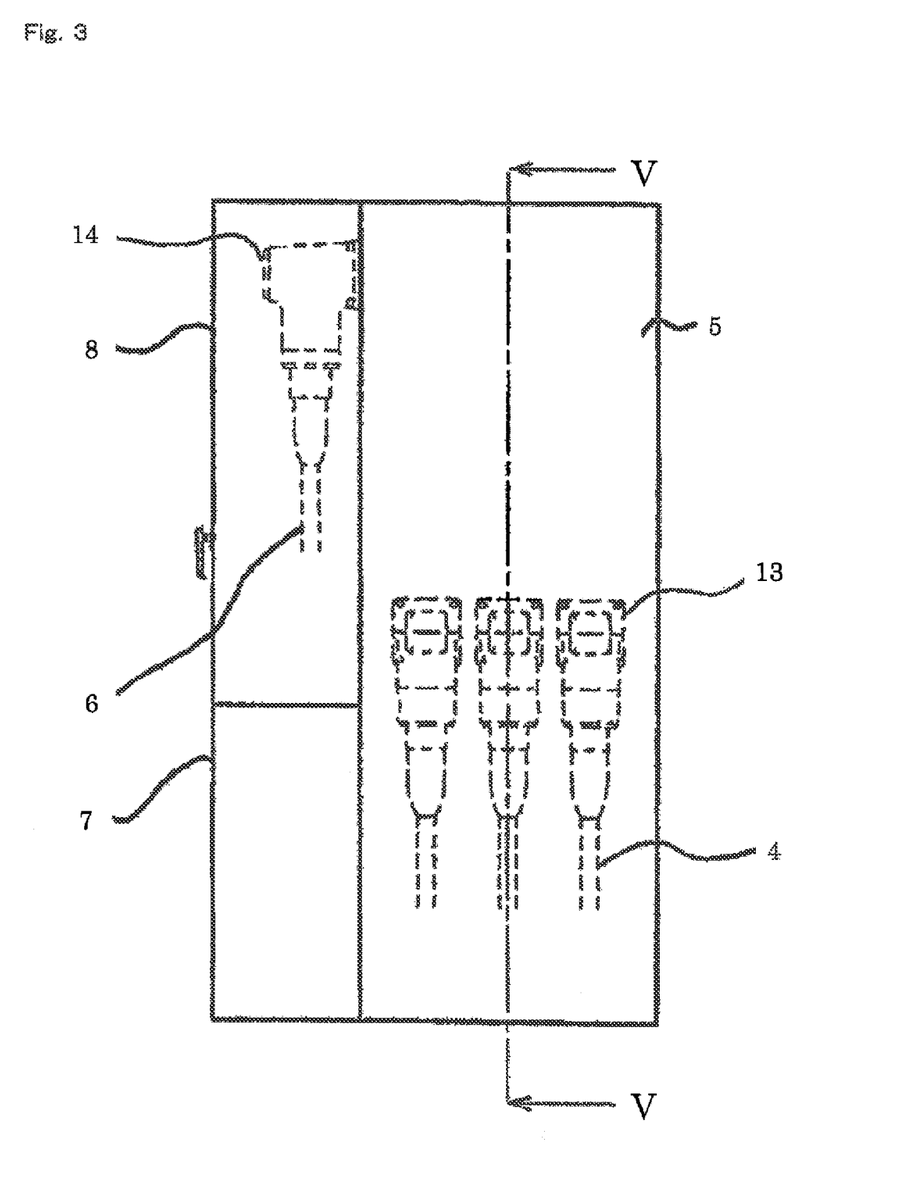
FIG. 3 is a right side of the gas insulated switchgear of FIG. 2.
Figure 4:
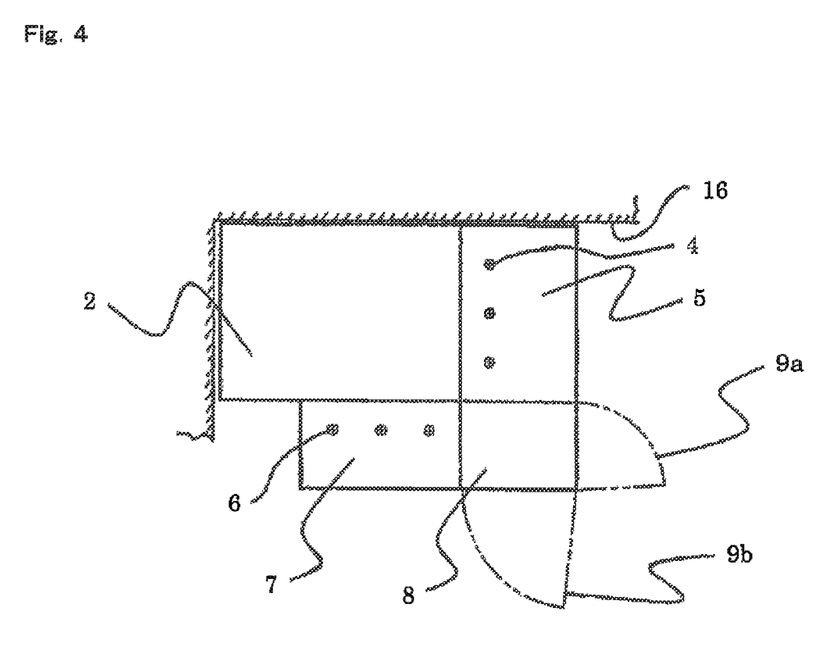
FIG. 4 is a sectional plan view seen in the direction of IV-IV of the gas insulated switchgear of FIG. 2.
Figure 5:
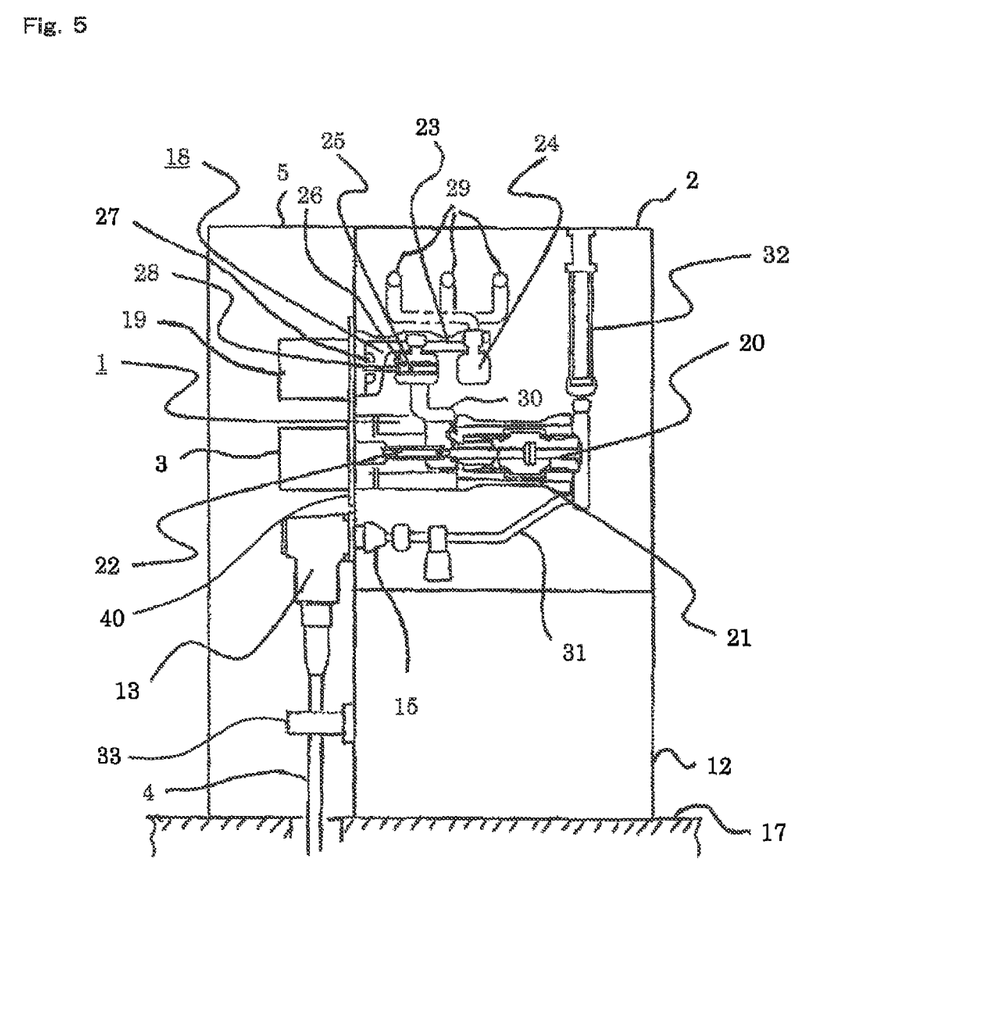
FIG. 5 is a sectional side view seen in the direction of V-V of the gas insulated switchgear of FIG. 3.

FIG. 1 is a perspective view of a gas insulated switchgear in Embodiment 1 for implementing the present invention; and FIG. 2, FIG. 3, and FIG. 4 are a front view, a right side view, and an IV-IV sectional plan view of FIG. 2, respectively. Furthermore, FIG. 5 is a sectional side view of a circuit breaker portion seen in the direction of V-V of FIG. 3.

Hereinafter, Embodiment 1 for implementing the present invention will be described with reference to the drawings. A gas insulated switchgear 101 includes: a pressure tank 2 in which insulating gas is filled and a circuit breaker 1 that performs open-circuit and close-circuit of a main circuit is placed inside; an operating mechanism compartment 5 in which an operating mechanism 3 that performs opening and closing operation of the circuit breaker 1 and a first cable 4 that is led to one terminal of the circuit breaker 1 are placed; a cable compartment 7 in which a second cable 6 that is led to the other terminal of the circuit breaker 1 is placed; and a control compartment 8 in which a control system (not shown in the drawing) that controls the gas insulated switchgear 101 is placed, and which is arranged between the operating mechanism compartment 5 and the cable compartment 7. One face of the control compartment 8 is provided with a door 9, and a locked state of a latching portion (not shown in the drawing) is released by the pivot of a handle 10; and thus, the door 9 pivots centering on a hinge portion (not shown in the drawing), and inspection of the inside of the control compartment 8 and opening and closing operation of the circuit breaker 1 can be made. A cover 5a is attachably and detachably attached to the side of the operating mechanism compartment 5; a cover 7a is attachably and detachably attached to the side of the cable compartment 7; and these covers are fastened by screws 11. Furthermore, reference numeral 12 denotes a pedestal that is located at the bottom of the pressure tank 2 to support the pressure tank.

Furthermore, in FIG. 2 to FIG. 5, 13 denotes a cable terminal in which an insertion portion of an end portion of the first cable 4 is integrated with a connection bushing 15 that is connected to a main circuit conductor in the pressure tank 2. Moreover, 14 denotes a cable terminal in which an insertion portion of an end portion of the second cable 6 is integrated with a connection bushing (not shown in the drawing) that is connected to the main circuit conductor in the pressure tank 2. In this case, the cable insertion directions of the cable terminals 13, 14 are each intersected with the connection direction of the main circuit.

Besides, in FIG. 4, 16 denotes a wall face of an electrical compartment; and the gas insulated switchgear 101 is ordinarily arranged adjacent to the wall face. In this case, when the operating mechanism compartment 5 side is used for operation and observation as the front side of the gas insulated switchgear 101 with respect to the pressure tank, the door 9 is openably/closably mounted by hinges (not shown in the drawing) as a door 9a of a first position. Furthermore, when the cable compartment 7 side is used for operation and observation as the front side of the gas insulated switchgear 101 with respect to the pressure tank, the door 9 is openably/closably mounted by hinges (not shown in the drawing) as a door 9b of a second position. In this regard, however, there also exists a case where both of the door 9a and the door 9b are provided, in addition to a case where the door 9a or the door 9b is selectively provided as described above.

Incidentally, in FIG. 4, when the lower side of the drawing is assumed as the front side of the gas insulated switchgear 101 and the upper side of the drawing is assumed as the back side, the control compartment 8 is arranged in a space portion surrounded by an extended line of a wall face on the right outside of the operating mechanism compartment 5 and an extended line of a wall face on the front side of the cable compartment 7. More specifically, the control compartment 8 is arranged at a corner portion on the front side of the operating mechanism compartment 5 and on the right side of the cable compartment 7; and the control compartment 8 is arranged such that a rear portion thereof comes in contact with the operating mechanism compartment 5 and a left side portion of the control compartment 8 comes in contact with the cable compartment 7. The arrangement is made in such a manner; and thus, measuring and controlling wires provided between the control compartment 8 and the operating mechanism compartment 5 and between the control compartment 8 and the cable compartment 7 can be unified regardless of the arrangement of the gas insulated switchgear. Furthermore, if in the case of the above-mentioned configuration, the space portion (that is, an useless space generated in a small space) surrounded by the extended line of the wall face on the right outside of the operating mechanism compartment 5 and the extended line of the wall face on the front side of the cable compartment 7 is used as the control compartment 8; and thus, the gas insulated switchgear 101 can be configured to be small in size. If the control compartment 8 is not provided in the above-mentioned space, the control compartment 8 needs to be arranged in an upper portion of the gas insulated switchgear 101 or to be separately arranged; and accordingly, a problem arises in that, for example, the height of the system is increased and/or the installation area thereof is increased.

Moreover, the above description shows an example in which the rear portion of the control compartment 8 comes in contact with the operating mechanism compartment 5 and the left side portion of the control compartment 8 comes in contact with the cable compartment 7; however, both are not necessarily come in contact. The same can be said when either is come in contact or even when a certain level of distance exists without coming in contact.

Next, in FIG. 5, insulating gas is filled and switches such as the circuit breaker 1 and a three position switch 18 are placed inside the pressure tank 2. Incidentally, the three position switch 18 is a switch that combines the functions of a disconnecting switch and a grounding switch and has each function of connection, disconnection, and grounding. Furthermore, the left side of FIG. 5 is the operating mechanism compartment 5 in which the operating mechanism 3 of the circuit breaker 1 and an operating mechanism 19 of the three position switch 18 are placed in an upper half portion; and the first cable 4 led from a floor 17 and the cable terminal 13 to which an leading end of the first cable 4 is inserted are collectively placed in a lower half portion. The pedestal 12 is arranged in the bottom of the pressure tank 2 to support the pressure tank 2 from the lower side.

A right upper portion of FIG. 5 shows the internal structure of the pressure tank 2 of the gas insulated switchgear 101. There is disclosed a case example in which a vacuum valve 20, which has a movable contact and a fixed contact in a vacuum vessel and opens/closes the main circuit, is provided as an interruption portion of the circuit breaker 1. The vacuum valve 20 is supported by an insulating frame 21 mounted on a base plate on which the operating mechanism 3 and the operating mechanism 19 are mounted; and the movable contact of the vacuum valve 20 is opening/closing-driven in the left/right direction in the drawing by the operating mechanism 3 mounted outside the left wall face of the pressure tank 2 via an insulating rod 22. Furthermore, the three position switch 18 having each function of connection, disconnection, and grounding is arranged in an upper portion of the circuit breaker 1. The three position switch 18 is supported by an insulating frame 23 mounted on the base plate 40, as in the circuit breaker 1.

The insulating frame 23 retains: a tubular fixed contact 24 at a leading end portion; a tubular intermediate electrode 26, which supports a rod-shaped movable contact 25, at an intermediate portion; and a grounding contact 27 at a base portion. The movable contact 25 is opening/closing-driven in the left/right direction in the drawing by the operating mechanism 19 mounted on the base plate 40 via an insulating rod 28. Then, the movable contact 25 becomes: a main circuit connection state by connecting to the fixed contact by the movement in the right direction; a disconnected state of the main circuit at an intermediate position; and a grounded state of the circuit breaker 1 side by coming into contact with the grounding contact 27 by the movement in the left direction. Lead-out conductors 29 for three phases are drawn upward from the fixed contact 24 of the three position switch and are drawn in a direction orthogonal to the page space of the drawing (the depth direction of the drawing). Each of the lead-out conductors 29 for three phases is connected to the cable terminal 14 of FIG. 3, respectively.

Furthermore, a movable side terminal of the circuit breaker 1 and the intermediate electrode 26 of the three position switch 18 are connected by a connection conductor 30. Further, a connection conductor 31 is connected between a fixed side terminal of the circuit breaker 1 and one end of the connection bushing 15 provided by passing through a left wall face of the pressure tank 2. In this manner, the main circuit between the cable terminal 13 and the cable terminal 14 is electrically connected via the circuit breaker 1 and the three position switch 18.

Besides, in the right upper side of the pressure tank, a lightning arrester 32 is arranged between the fixed side terminal of the circuit breaker 1 and the pressure tank 2. Further, a current transformer 33 is arranged around the first cable 4 in the operating mechanism compartment 5.

Incidentally, FIG. 5 shows a main circuit configuration for single phase; however, this system is ordinarily used in three phases and circuits for three phases are arranged in the depth direction of the drawing.

Furthermore, for example, when the gas insulated switchgear 101 is used at a connection portion between a generator of a wind-power generation system and an external transmission line, the first cable 4 is referred to as "the lead-in side" from the generator and the second cable 6 is referred to as "the lead-out side" to the transmission line. According to this expression, the locations of respective connection portions for lead-in and lead-out of the cables are provided in the gas insulated switchgear according to the present invention as follows: one connection portion is located on the mounting face side (first side) of an opening and closing operation device of the gas insulated switchgear; and the other connection portion is located in a direction orthogonal to the mounting face of the opening and closing operation device and on a lateral (second side) of the gas insulated switchgear.

Figure 6:
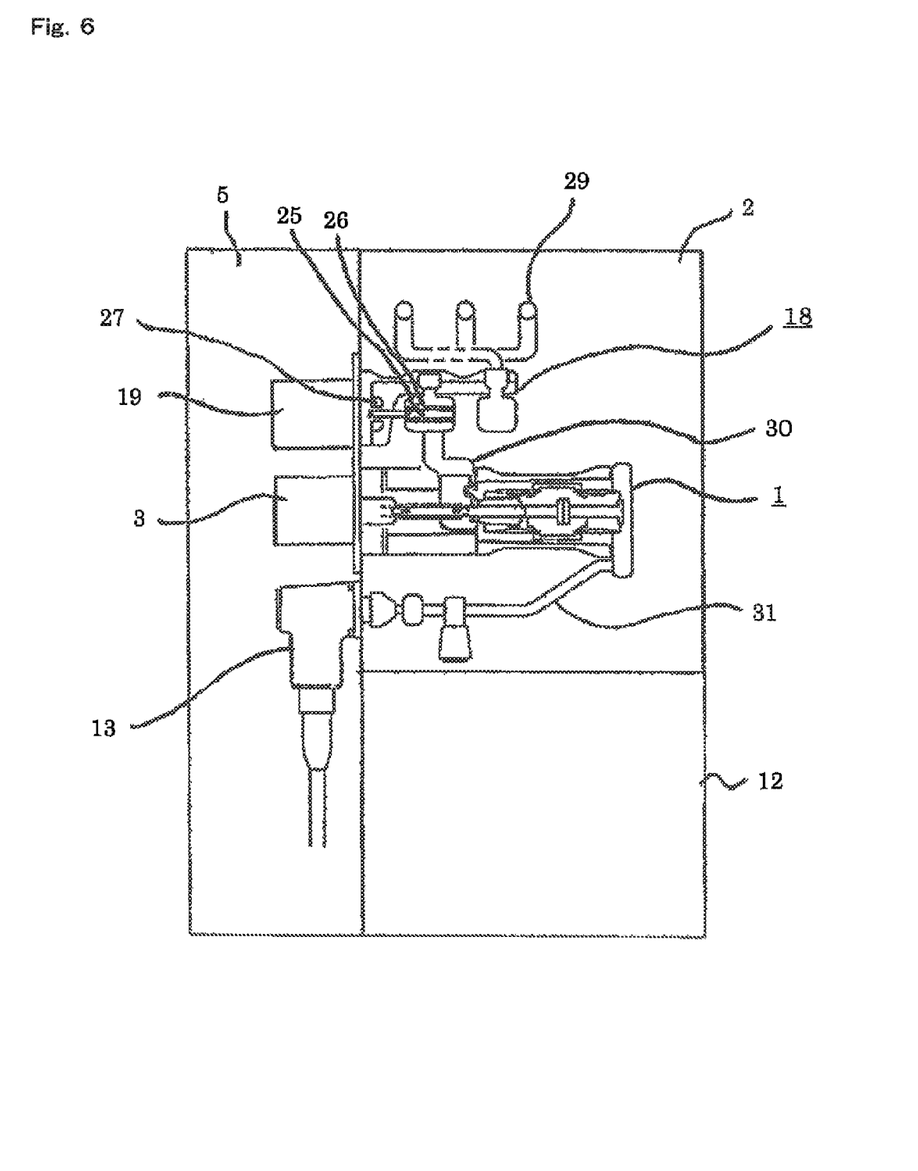
FIG. 6 is a sectional side view in which the configuration of FIG. 5 is partly changed.

FIG. 6 shows a state where the lightning arrester 32 is removed from the configuration of FIG. 5 in Embodiment 1. When the lightning arrester 32 is not necessary, it becomes such a configuration. The fixed contact 24 of the three position switch 18 is connected by the lead-out conductor 29; the intermediate electrode 26 of the three position switch 18 and the movable side terminal of the circuit breaker 1 are connected therebetween by the connection conductor 30; and the fixed side terminal of the circuit breaker 1 and the connection bushing 15 are connected therebetween by the connection conductor 31.

Figure 7:
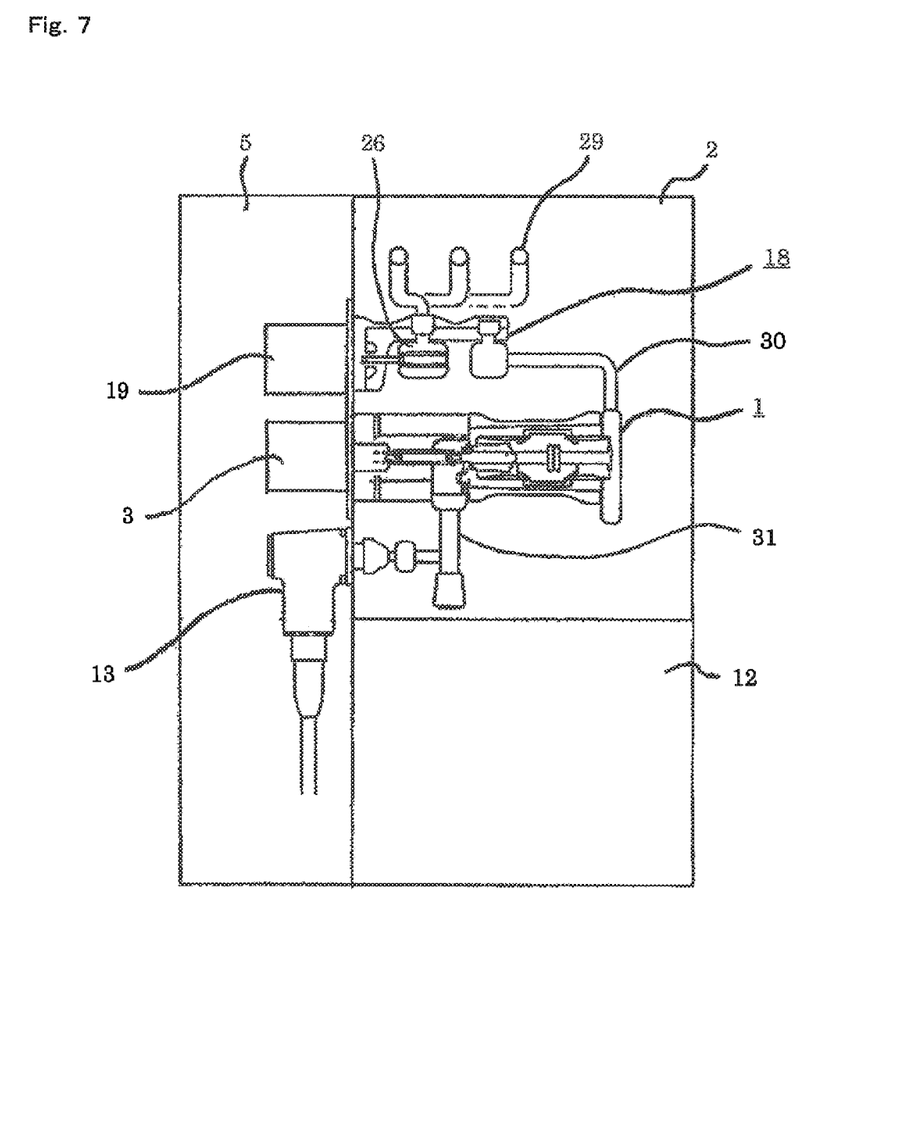
FIG. 7 is a sectional side view in which the configuration of FIG. 5 is further partly changed.

FIG. 7 shows a configuration which is further changed from the configuration of FIG. 6, that is, FIG. 7 shows a state in which connections of the lead-out conductor 29, the three position switch 18, and the circuit breaker 1 are changed. The intermediate electrode 26 of the three position switch 18 is connected by the lead-out conductor 29; the fixed contact 24 of the three position switch 18 and the fixed side terminal of the a circuit breaker 1 are connected therebetween by the connection conductor 30; and the movable side terminal of the circuit breaker 1 and the connection bushing 15 are connected therebetween by the connection conductor 31.

In such a configuration, when the movable contact 25 is further moved in the left direction from the state of FIG. 7 by grounding operation of the operating mechanism 19, the movable contact 25 comes into contact with the grounding contact 27 to become a grounded state. In this case, the lead-out conductor 29 side can be grounded.

Since the configuration is made in such a manner, even when a certain level of insulation distance needs to be secured for ensuring withstand voltage performance in a switchgear for high voltage, one cable connection portion is arranged at a space portion in the lower side of the operating mechanisms 3, 19 and the other cable connection portion is arranged on a lateral in a direction orthogonal with respect to the axis in the direction of the circuit breaker 1 from the operating mechanism 3; and therefore, the whole size of the gas insulated switchgear can be configured to be small and there can be obtained a gas insulated switchgear capable of installing even in a narrow electrical compartment.

Furthermore, the control compartment is arranged between two compartments covering two cable connection portions arranged in the orthogonal state and thus effectively utilizes an arrangement space; and therefore, the whole size of the gas insulated switchgear can be configured to be small and there can be obtained the gas insulated switchgear capable of installing even in the small electrical compartment.

Besides, two faces of the gas insulated switchgear 101 can be selectively used or both faces thereof can be used for maintenance or operation; and therefore, installation can be made even in a state where the back and the side of the side (face), to which cables are not connected, of the gas insulated switchgear come in contact with a building wall face and/or an adjacent structure.

Embodiment 2

Figure 8:
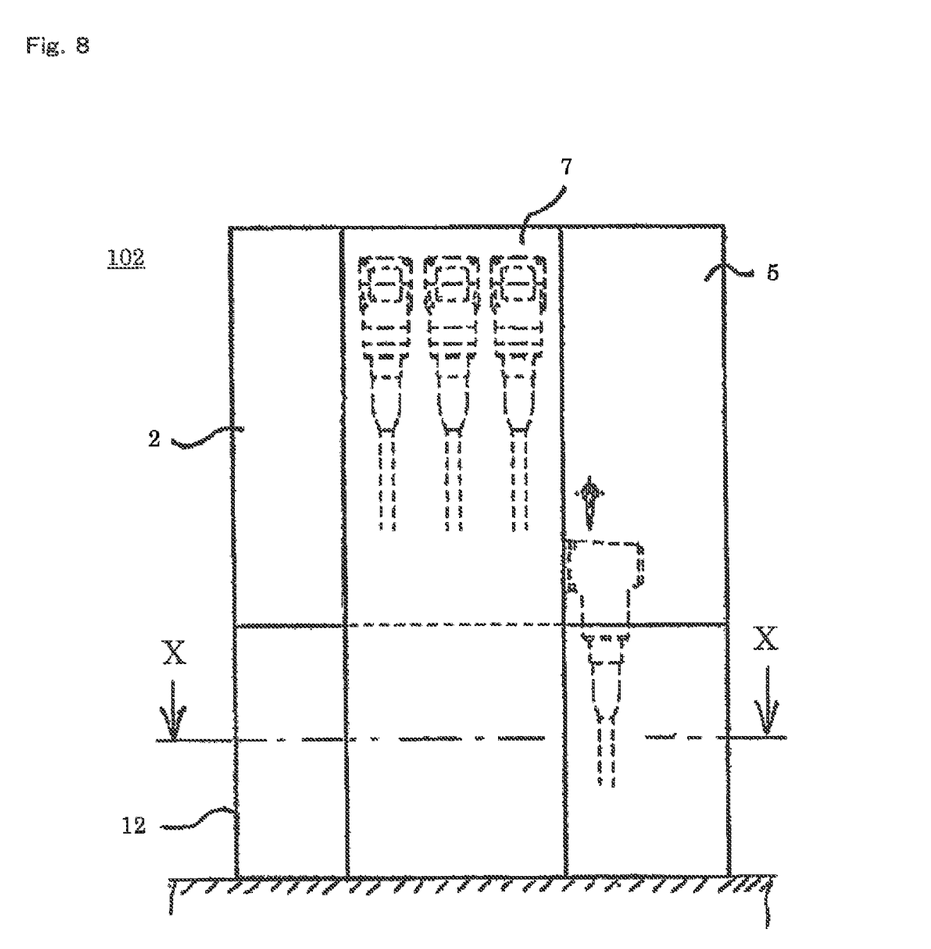
FIG. 8 is a front view showing a gas insulated switchgear of Embodiment 2 of the present invention.
Figure 9:
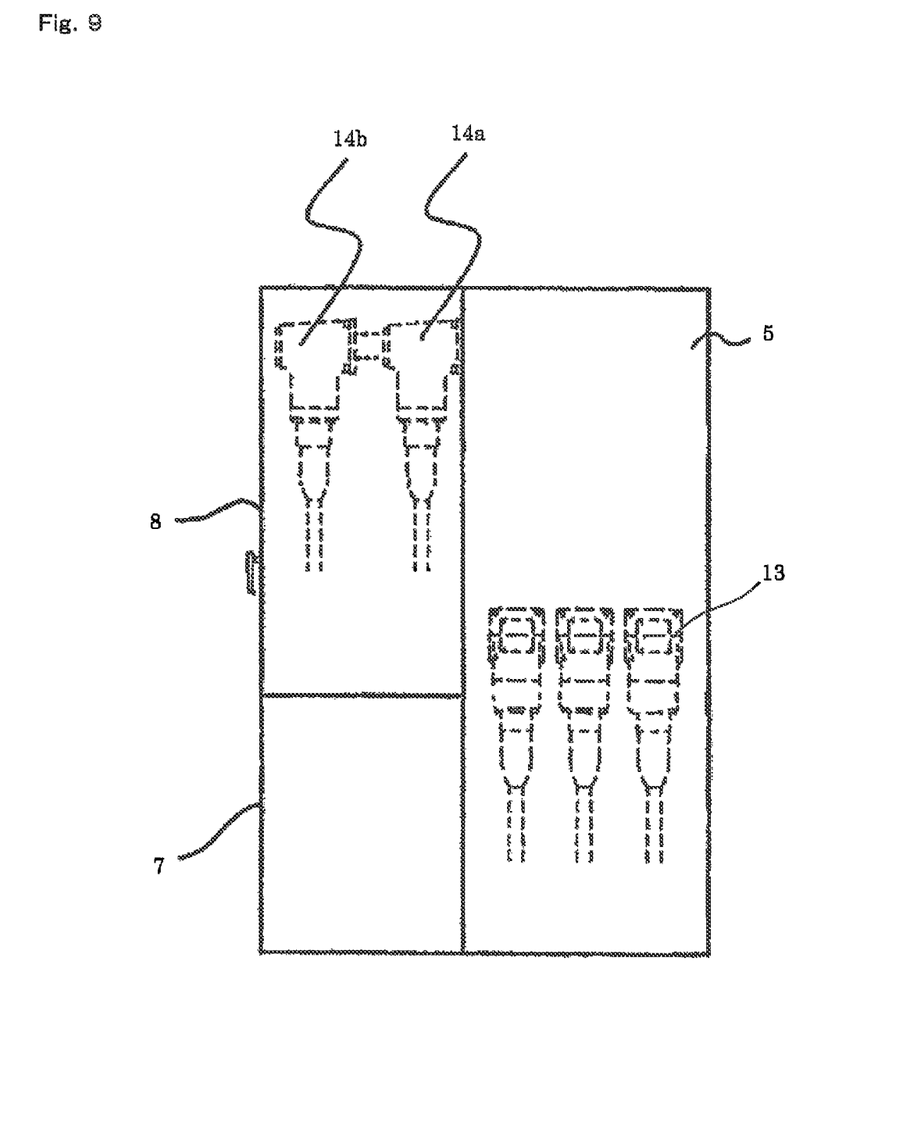
FIG. 9 is a right side view of the gas insulated switchgear of FIG. 8.
Figure 10:
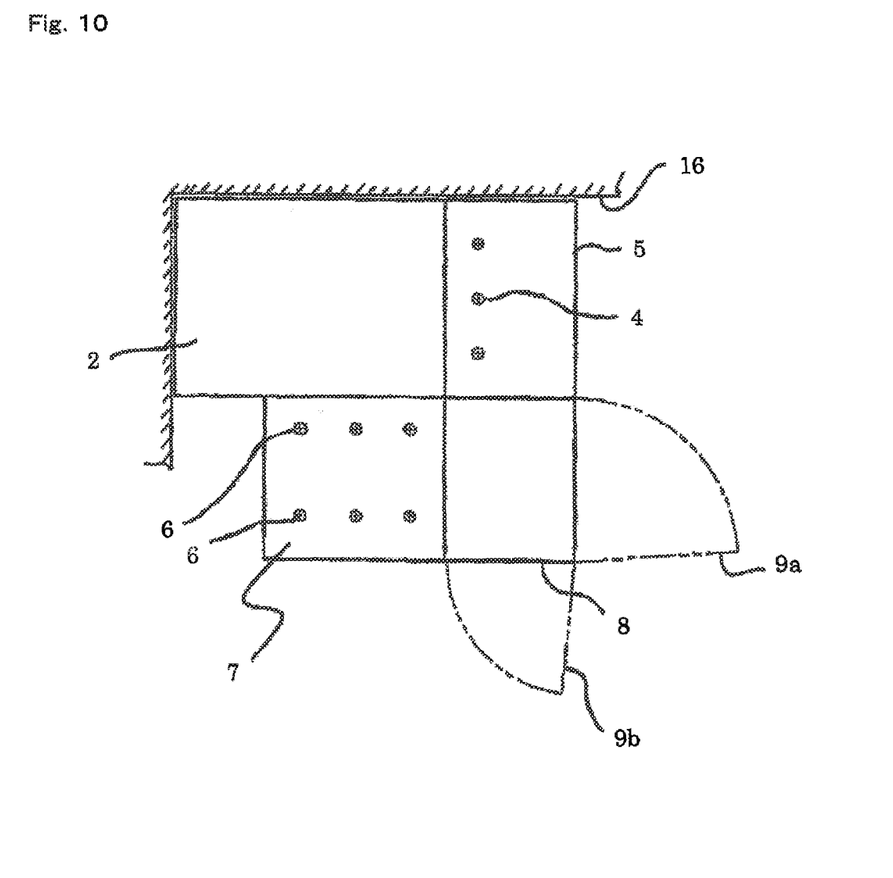
FIG. 10 is a sectional plan view seen in the direction of X-X of the gas insulated switchgear of FIG. 8.

FIG. 8 to FIG. 10 are views each showing a gas insulated switchgear 102 in Embodiment 2 of the present invention; FIG. 8 is a front view; FIG. 9 is a right side view of FIG. 8; and FIG. 10 is a sectional plan view seen in the direction of X-X of FIG. 8. In the drawings, three cable terminals 14a are connected to three phase lead-out conductors 29 (FIG. 5), respectively, in a cable compartment 7 via a sidewall of a pressure tank 2, as in FIG. 2 to FIG. 4.

Two cable terminals 14a and 14b are connected to each other. The cable terminal 14b is connected to a rear connection portion (detail of the connection portion is not shown in the drawing) of the cable terminal 14a.

A plurality of cable terminals are connected in series; and thus, a plurality of cables can be connected. There shows a case example where the number of cables in a operating mechanism compartment 5 is increased in this embodiment; however, much the same is true on cable terminals 13 on the right side of the pressure tank 2.

Furthermore, either of doors 9a, 9b of a control compartment 8 may be selectively provided or both of the doors 9a, 9b may be provided, depending on a state of an electrical compartment to which the gas insulated switchgear 102 is installed.

Since the configuration is made in such a manner, even when the connection cables are three-phase double circuits, a depth dimension is increased by a cable terminal 14b for one circuit as shown in FIG. 9. However, an increase in dimension is slight as the whole gas insulated switchgear 102 and there can be obtained the gas insulated switchgear capable of installing even in a narrow electrical compartment.

Embodiment 3

Figure 11:
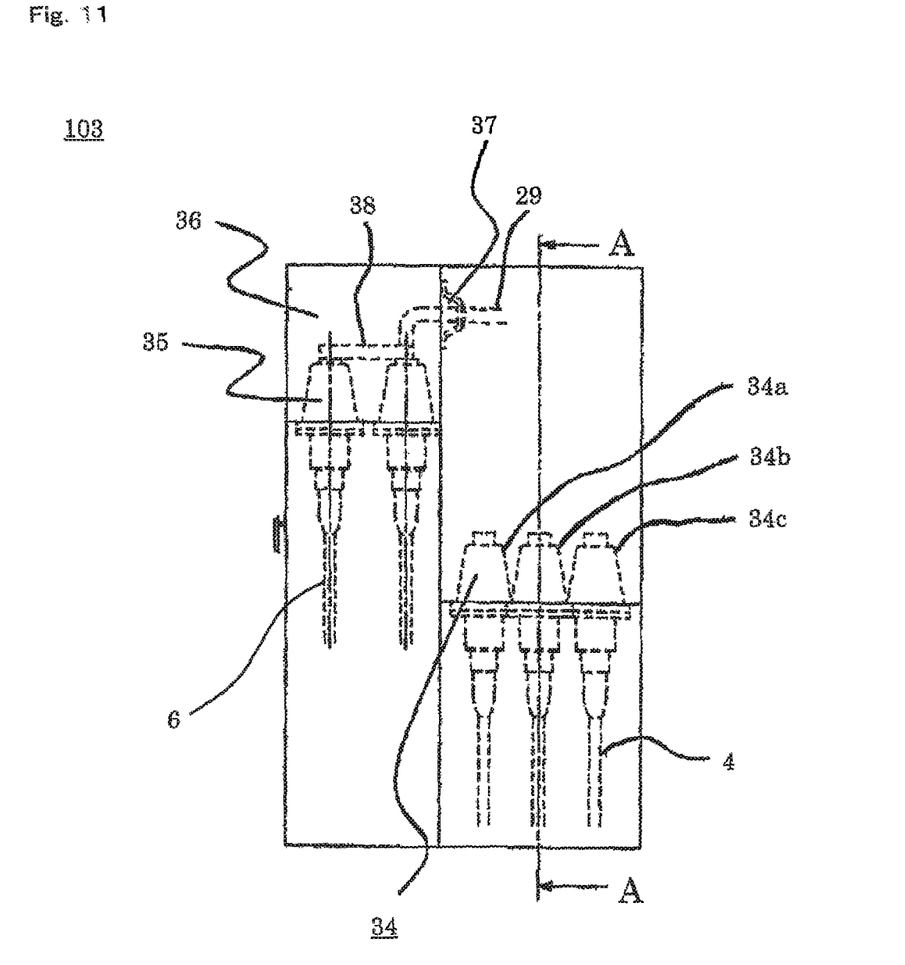
FIG. 11 is a right side view of a gas insulated switchgear according to Embodiment 3 of the present invention.
Figure 12:
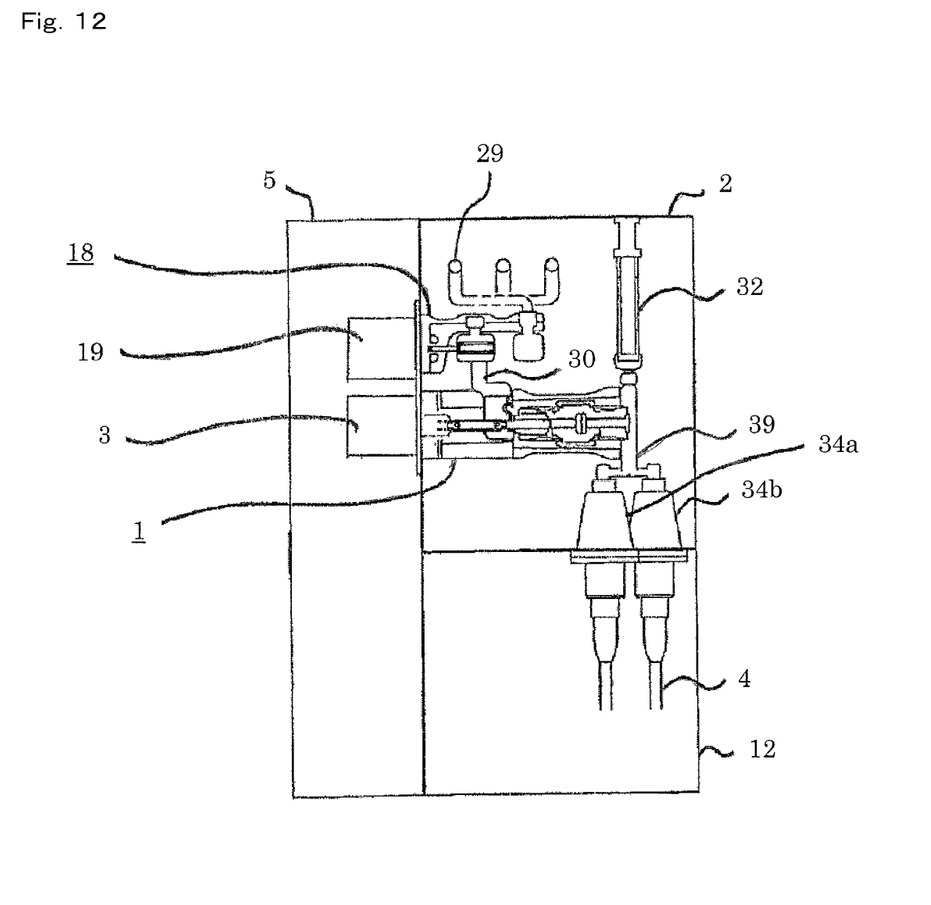
FIG. 12 is a sectional back view seen in the direction of A-A of the gas insulated switchgear of FIG. 11.

FIG. 11 is a side view and FIG. 12 is a sectional side view seen in the direction of A-A, each showing a gas insulated switchgear 103 in Embodiment 3 of the present invention. In the case of adopting a cable terminal in which a cable insertion direction is the same as a main circuit connection direction, there disposes a pressure tank 36 whose gas compartment is the same as a pressure tank 2.

Places where reference numerals are not particularly given in FIG. 11 are the same as FIG. 3. In FIG. 11, a cable terminal 34 on the first cable 4 side is provided on a bottom plate of the pressure tank 2; and an leading end of the first cable 4 raised upward from a floor 17 (FIG. 5) is inserted into the cable terminal 34.*

Furthermore, in FIG. 11, a second pressure tank 36 is arranged so as to come in contact with the pressure tank 2 on a left upper portion of the pressure tank 2; and a lead-out conductor 29 in the pressure tank 2 is led-in via an insulating spacer 37 and is connected to a terminal conductor of a cable terminal 35 provided on a bottom plate of the second pressure tank 36. The cable terminals 35 are installed side by side so as to be disposed in pairs for each phase and to be connected in parallel by a connection conductor 38. A second cable 6 is raised upward from the floor 17 (FIG. 5) and is connected to the cable terminal 35.

FIG. 12 is a sectional back view seen in the direction of A-A of FIG. 11. The cable terminal 34 is mounted in the pressure tank 2 in a state where a connecting opening is provided outside by passing through the bottom plate of the pressure tank 2; and a fixed side terminal of a leading end of a circuit breaker 1 and a terminal conductor of the cable terminal 34 are connected by a connection conductor 39. The cable terminals 34 need to be attached within a limited width of the pressure tank 2; and thus, the arrangement of the axis center of respective phase conductors is arranged in the shape of a triangle seen from the upper side. More specifically, cable terminals 34a and 34c of an R phase and a T phase on both sides of the R phase, an S phase, and the T phase are arranged on the left side of FIG. 12, and a cable terminal 34b of the S phase serving as a central phase is arranged on the right side of FIG. 12; and thus, attachment within the limited width of the pressure tank 2 can be made. The first cable 4 is raised upward from the floor and is connected to the cable terminal 34. When a wall and/or adjacent equipment is present on the right side of FIG. 12, this connection work is performed by directly entering in a pedestal 12 from an operating mechanism compartment 5 on the left side of FIG. 12.

An application can be made by this Embodiment 3 even when the connection direction of the cable terminal is the same as the raised direction of the cable.

Embodiment 4

Figure 13:
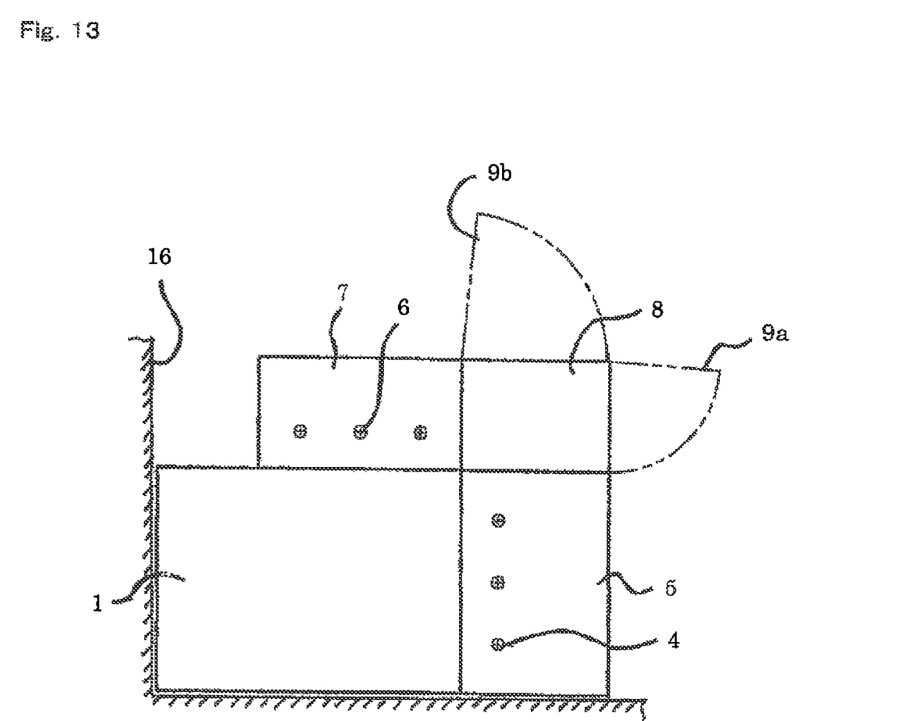
FIG. 13 is a sectional plan view corresponding to FIG. 4 and showing a gas insulated switchgear according to Embodiment 4 of the present invention.

FIG. 13 is one in which, when seen from the front of a gas insulated switchgear, the mounting direction of an operating mechanism compartment is reversed right and left with respect to the configuration of FIG. 4. Since the configuration is made in such a manner, correspondence can be easily made even when wall faces of an electrical compartment are reversed up and down with respect to FIG. 4.

Incidentally, the present invention can freely combine the respective embodiments and appropriately change or omit the respective embodiments, within the scope of the present invention.

INDUSTRIAL APPLICABILITY

The present invention is suitable for achieving a gas insulated switchgear capable of reducing installation area and installation height.

The invention claimed is:

1. A gas insulated switchgear configured to be placed on a floor surface, comprising:
    a pressure tank in which a switch and connection conductors for use in said gas insulated switchgear are stored inside together with insulating gas, the pressure tank including a top surface that faces away from the floor surface, and a plurality of side surfaces that extend in a perpendicular direction to the floor surface;
    an operating mechanism that is attached to a first side surface of said pressure tank, and performs opening and closing operation of said switch;
    a first cable connection portion that is attached to the first side surface of said pressure tank, and is connected to said connection conductors, said first cable connection portion being connected to the lead-in side or the lead-out side; and
    a second cable connection portion that is attached to a second side surface of said pressure tank parallel with respect to a direction connecting said operating mechanism and said switch, and is connected to said connection conductors, said second cable connection portion being connected to the side different from said first cable connection portion of the lead-in side or the lead-out side.

2. A gas insulated switchgear comprising:
    a pressure tank in which a switch for use in said gas insulated switchgear is stored together with insulating gas;
    an operating mechanism that is attached to one face of said pressure tank, and performs opening and closing operation of said switch;
    a first cable connection portion that is attached to one face of said pressure tank;
    an operating mechanism compartment that covers the outer periphery of said operating mechanism and said first cable connection portion;
    a second cable connection portion that is attached to the other face of said pressure tank parallel with respect to a direction connecting said operating mechanism and said switch;
    a cable compartment that covers the outer periphery of said second cable connection portion; and
    a control compartment that is arranged between both of a lateral of said operating mechanism compartment and a lateral of said cable compartment.

3. The gas insulated switchgear according to claim 2, wherein said control compartment is arranged between both by connecting the lateral of said operating mechanism compartment and the lateral of said cable compartment.

4. The gas insulated switchgear according to claim 2, wherein either face or both faces of said first cable connection portion and said second cable connection portion serve as an operating face of said switchgear.

5. The gas insulated switchgear according to claim 3,
wherein either face or both faces of said first cable connection portion and said second cable connection portion serve as an operating face of said switchgear.

6. The gas insulated switchgear according to claim 2,
wherein said control compartment is provided with an opening portion toward either direction of the first cable connection portion side or the second cable connection portion side of said gas insulated switchgear, and
said opening portion is openably/closably covered by a door.

7. The gas insulated switchgear according to claim 3,
wherein said control compartment is provided with an opening portion toward either direction of the first cable connection portion side or the second cable connection portion side of said gas insulated switchgear, and
said opening portion is openably/closably covered by a door.

8. The gas insulated switchgear according to claim 4,
wherein said control compartment is provided with an opening portion toward either direction of the first cable connection portion side or the second cable connection portion side of said gas insulated switchgear, and
said opening portion is openably/closably covered by a door.

9. The gas insulated switchgear according to claim 5,
wherein said control compartment is provided with an opening portion toward either direction of the first cable connection portion side or the second cable connection portion side of said gas insulated switchgear, and
said opening portion is openably/closably covered by a door.

10. The gas insulated switchgear according to claim 1,
wherein, at said first cable connection portion or said second cable connection portion, a plurality of cable terminals are connected in series to be able to connect a plurality of cables.

11. The gas insulated switchgear according to claim 2,
wherein, at said first cable connection portion or said second cable connection portion, a plurality of cable terminals are connected in series to be able to connect a plurality of cables.

12. The gas insulated switchgear according to claim 1,
wherein, at said first cable connection portion or said second cable connection portion, the connection direction of said cable terminals is a cable lead-in direction.

13. The gas insulated switchgear according to claim 2,
wherein, at said first cable connection portion or said second cable connection portion, the connection direction of said cable terminals is a cable lead-in direction.

14. The gas insulated switchgear according to claim 1,
wherein the first side surface and the second side surface are adjacent each other.

* * * * *